Figure 1:
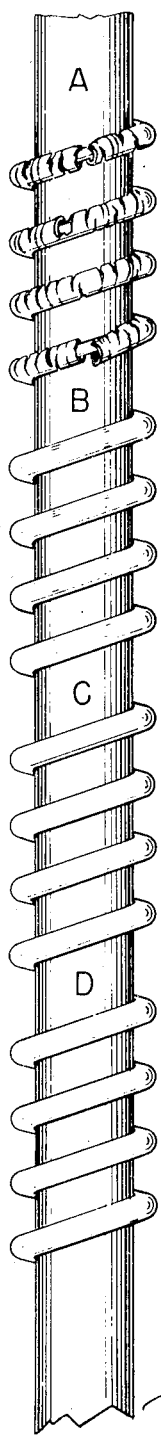

Patented Apr. 26, 1949

2,468,480

UNITED STATES PATENT OFFICE 2,468,480

COATING COMPOSITION CONTAINING POLYETHYLACRYLATE AND A CHLORINATED HYDROCARBON POLYMER

Charles Edward Bradley, Jr., Westport, Conn., assignor to R. T. Vanderbilt Company, Inc., New York, N. Y., a corporation of New York Application June 7, 1946, Serial No. 675,283

4 Claims. (Cl. 260—3.5)

I have invented a coating composition of special value in application to vulcanized rubber, synthetic rubber as well as natural rubber products, to form surface films effective to protect the rubber against degradation resulting from exposure to sunlight, ozone and oxidation at ordinary temperatures. The coating composition of my invention consists essentially of a solution, in a volatile aromatic solvent, of polyethylacrylate and either chlorinated rubber or polymeric chlorinated isoprene which solution may be, and to develop maximum protection against sunlight exposure is, pigmented. In the accompanying drawing, I have represented, in Fig. 1, the results of a test comparison under exposure to ozone of both an uncoated vulcanized rubber sample and three samples protected by application of the coating composition of my invention and, in Fig. 2, one form of apparatus appropriate for polymerization of ethylacrylate.

As is well known, vulcanized rubber products tend to become degraded upon exposure to sunlight or ozone or other conditions resulting in oxidation or something apparently akin to oxidation at ordinary temperatures. Although the immediate causes of such degradation, if not its mechanism, have long been recognized, and although the serious nature of the losses thus incurred in many types of goods has long been appreciated, no generally satisfactory solution of the problem has hitherto appeared. For example, although vulcanized rubber insulation has superior electrical properties in many respects, its use in applications involving exposure to ozone has been limited by the incidence of this weakness. Also, many rubber goods which must of necessity be exposed to sunlight in ordinary use, such as motor vehicle tires, sometimes seem to deteriorate unused about as fast as when actively used. Again, with many vulcanized rubber products, such degradation tends to take place during the periods of storage inevitably incident to merchandising of the goods. One approach to the problem, useful in many instances, is through the compounding of the composite subjected to vulcanization, but this approach is not universally available for a variety of reasons. Cost is frequently a bar. Again, the tendency toward degradation immediately on the exposed surface, the surface which determines appearance which in turn is important in many goods and the surface which is technically important in many applications particularly in the electrical field, is too strong thus to be eliminated. Another approach lies in the application of a coating composition, such as that of my invention, but such coating compositions as have hitherto been proposed have been at best of limited application. Few, if any, of such coating compositions have, for example, had any real capacity to produce a protective surface film remaining effective when subjected to flexing although the elastic properties of the vulcanized rubber products involved are frequently fundamental to their value.

Some of the coating compositions hitherto proposed have even had the effect of themselves inducing similar degradation of the goods to which they have been applied after affording some limited protection with respect to, for example, exposure to sunlight or ozone.

The coating composition of my invention, when applied to a vulcanized rubber product, forms a surface film which is itself immune to such degradation, which does not induce degradation of the product to which it is applied, and which is resistant to disintegration and displacement as the result of flexing of the vulcanized rubber product. A high order of protection against degradation resulting from exposure to sunlight or ozone or other oxidation at ordinary temperatures is thus secured. This protection is available independently of the compounding of the composite subjected to vulcanization. Further, this film appears to suppress the bloom resulting from migration of compounding materials encountered in many goods, and, where appearance is important, it makes possible the application of a durable finish of high gloss.

As stated, the coating composition of my invention consists essentially of a plastic base of polyethylacrylate and a chlorinated hydrocarbon of the class consisting of chlorinated rubber and polymeric chlorinated isoprene in solution in a volatile aromatic solvent. Of the total of polyethylacrylate and chlorinated hydrocarbon, I use a major proportion of polyethylacrylate and a minor proportion of the chlorinated hydrocarbon. In general, I have found that the proportion of chlorinated hydrocarbon should approximate from about ¼ to about ¾ of the polyethylacrylate. The polyethylacrylate is sufficiently saturated to be stable. It tends to be tacky, but the tackiness of the composite with the chlorinated hydrocarbon or the chlorinated hydrocarbon and a pigment can be made just right, and the polyethylacrylate and the chlorinated hydrocarbon are satisfactorily compatible.

One of the advantages of the coating composition of my invention is that it need not be black. Carbon black is a useful pigment, but other pigments such as titanium dioxide are also useful, and consequently coating films of a wide range of color can be produced.

The proportion of the chlorinated hydrocarbon is adjusted to avoid as a maximum excessive brittleness and as a minimum excessive tackiness. If the coating composition is not pigmented, the maximum proportion of the chlorinated hydrocarbon should be about ⅝ to ¾ of the polyethylacrylate, the minimum about ¼ to ½. If the coating composition is pigmented, the minimum proportion of the chlorinated hydrocarbon remains about the same, but the maximum proportion may be reduced as the proportion of pigment increases. For example, if a proportion of carbon black representing ¼ of the polyethylacrylate is used, the proportion of the chlorinated hydrocarbon may be reduced to ¼ to ½ of the proportion of polyethylacrylate, or if a proportion of titanium dioxide equal to that of the proportion of polyethylacrylate is used, the proportion of the chlorinated hydrocarbon may be reduced to ¼ to ⅜ of the proportion of polyethylacrylate. For best results in terms of resistance to exposure to sunlight, the coating composition should be pigmented. When the relative proportions of the polyethylacrylate and the chlorinated hydrocarbon are within the above ranges, the polyethylacrylate is sufficient in amount to so plasticize the chlorinated hydrocarbon that films deposited from the composition are flexible.

The coating composition of my invention may be applied, for example, by dipping, by brushing or by spraying. As in conventional application practices, the proportion of vehicle used will be adjusted to the particular method of application. The volatile aromatic solvents are generally useful as vehicles. Xylol and xylol mixtures are particularly advantageous. For application by dipping or brushing, the proportion of vehicle may be, for example, about twelve times the proportion of polyethylacrylate. For application by spraying the proportion of vehicle may be, for example, 30 to 40 times the proportion of polyethylacrylate. For best results it is important that the surface of vulcanized rubber products to which my coating composition is applied be clean at the time of applicaion. Such cleaning can be effected by conventional treatment with a solvent or with a solvent and an abrasive. It is particularly important that any greasy bloom, such as that which characteristically appears on the surface of vulcanized GR-S products, be removed before application of my coating composition. At ordinary temperatures, a tack-free film is usually obtained in about 20 minutes after application of the coating composition of my invention. The drying rate can be considerably increased by drying at elevated temperatures. Drying temperatures up to about 200° F. are satisfactory.

The three following examples illustrate three coating compositions embodying my invention. In each of these examples the chlorinated hydrocarbon is chlorinated rubber or chlorinated isoprene. In each of these examples proportions are given in parts by weight.

|  | Example I | Example II | Example III |
| --- | --- | --- | --- |
| Xylol | 100 | 100 | 100 |
| Polyethylacrylate | 8 | 8 | 8 |
| Chlorinated hydrocarbon | 5 | 3 | 2 |
| Carbon black |  | 2 |  |
| Titanium dioxide |  |  | 8 |

These compositions are conveniently compounded by breaking down the polyethylacrylate on a conventional mill for about 10 minutes and then incorporating the pigment, if any, on the mill, and thereafter incorporating the polyethylacrylate, pigmented or unpigmented, and the chlorinated hydrocarbon in the volatile aromatic solvent in a conventional churn.

Figure 2:
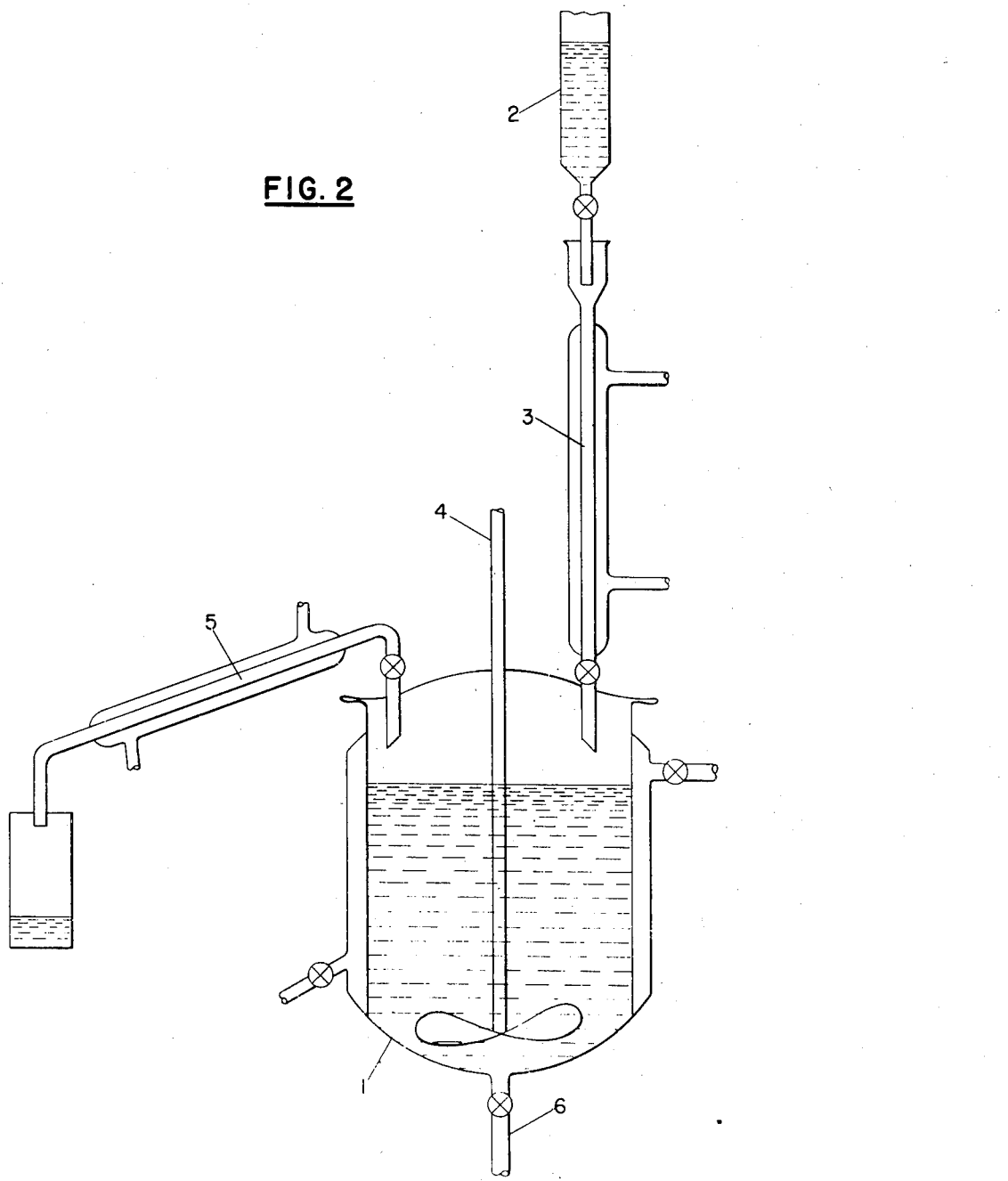

In one test comparison I have made, I have applied each of the several compositions of the foregoing examples to samples of the same vulcanized rubber insulation on an electrical conductor and have simultaneously exposed those three samples and another uncoated sample of the same vulcanized rubber insulated conductor to an atmosphere containing 0.015% ozone for 7 hours at 70° F., a severe test. At the end of this period, no degradation of the three coated samples could be detected but the vulcanized rubber of the uncoated sample had deteriorated to an extent such that it was cracked through to the conductor in many places and had actually broken away exposing the conductor in some places. I have represented the comparative results as well as can be in a drawing in Fig. 1 of the accompanying drawing, where the several test samples are shown as wrapped upon the mandrel, to stress the surface of the vulcanized rubber insulation, during exposure to ozone. In Fig. 1, the uncoated sample is marked A, the sample coated with the composition of Example I, B, the sample coated with Example II, C and the sample coated with the composition of Example III, D. In another test comparison I have made, I have applied the coating composition of Example II above to tires in actual service during winter months in New England to produce an applied protective coating and it was intact after 3,000 miles driving except in spots where it had been removed by direct abrasion.

The method of production of the polyethylacrylate used in the composition of my invention is not involved in my invention. Effective polymerization procedures have previously been described, for example in Industrial and Engineering Chemistry, vol. 37, page 365, April, 1945. This polymerization may be carried out, for example, in apparatus such as that illustrated in Fig. 2 of the accompanying drawing, as follows:

An aqueous emulsion containing about 40–50% of freshly distilled monomeric ethylacrylate is made up with an appropriate wetting agent, for example about 2% by weight on the ethylacrylate of a 25% aqueous solution of the sodium sulfate derivative of 7-ethyl-2-methyl-undecanol-4, charged into the jacketed reaction vessel 1 and there warmed to about 158° F. An aqueous solution of the polymerization catalyst ammonium persulfate for example is then added slowly from supply vessel 2 through reflux condenser 3 while maintaining moderate agitation by means of stirrer 4. The rate of addition of catalyst, 0.05%–0.1% by weight on the ethylacrylate, of ammonium persulfate for example, is controlled so that the emulsion gradually rises to a temperature of 198° F. without further external heating of the reaction vessel. After holding the temperature constant at 198° F. for a few minutes, the reflux condenser is closed off and unreacted monomer, usually about 5% of the original ethylacrylate, is distilled off through condenser 5. The hot emulsion is then sprayed, through connection 6 into an aqueous solution of sodium chloride at the same temperature to form a fine crumb which, after washing by decantation is dried and sheeted.

Some compounding materials used in the production of vulcanized rubber products have a tendency to migrate through organic films in contact with such products as well as a tendency to discolor which may be masked by darker colors such as that of the original product. Thus, when using unpigmented coating compositions or light colored coating compositions of my invention in applications where appearance is important, the use of discoloring compounding materials in the production of the vulcanized rubber product to which the coating composition is to be applied should be avoided if best results are to be secured.

The coating compositions of my invention are also useful in applications other than application to vulcanized rubber products. For example, I have used my coating compositions to produce acid resisting coverings on metal parts exposed to splash, spray or leakage from storage batteries in truck and tractor units with good results. In such applications, particularly where the protective covering is subjected to severe mechanical stress, it is frequently advantageous to make several successful applications of the coating compositions to the material to be protected.

I claim:

1. A coating composition comprising a volatile aromatic solvent and a plastic base dissolved therein, the plastic base consisting of polyethylacrylate and a chlorinated hydrocarbon of the class consisting of chlorinated rubber and polymeric chlorinated isoprene, the proportion of the chlorinated hydrocarbon ranging from one-fourth to three-fourths of the polyethylacrylate, the polyethylacrylate being present in sufficient amount that it constitutes the sole plasticizer for the chlorinated hydrocarbon in films deposited from the composition.

2. A coating composition as defined in claim 1 which also contains a pigment.

3. A coating composition as defined in claim 1 which also contains carbon black.

4. A coating composition as defined in claim 1 which also contains titanium dioxide.

CHARLES EDWARD BRADLEY, Jr.

REFERENCES CITED

The following references are of record in the file of this patent:

UNITED STATES PATENTS

| Number | Name | Date |
|---|---|---|
| 2,069,983 | Ubben | Feb. 9, 1937 |
| 2,364,589 | Raynolds et al. | Dec. 5, 1944 |